Sept. 6, 1955     J. A. MOORE     2,716,786

BRACKET CLIP FOR JALOUSIE WINDOW

Filed Jan. 10, 1955

INVENTOR.
John A. Moore
BY
Frank Makora
ATTORNEY

United States Patent Office 2,716,786
Patented Sept. 6, 1955

2,716,786

BRACKET CLIP FOR JALOUSIE WINDOW

John A. Moore, Merrick, N. Y.

Application January 10, 1955, Serial No. 480,883

2 Claims. (Cl. 20—62)

This invention relates to a bracket for holding a pane of glass in place and more particularly to a bracket adapted to removeably hold in place a pane of glass of the jalousie window type.

It is an objective of this invention to provide a self locking bracket, for holding jalousie glass panels, made of inexpensive construction.

It is another objective of this invention to provide a bracket adapted to receive a pane of glass selectively through either the top or the bottom of the bracket piece.

It is yet another objective to provide a resilient bracket adapted to firmly hold a pane of glass at a plurality of spaced-apart points.

Figure 4:
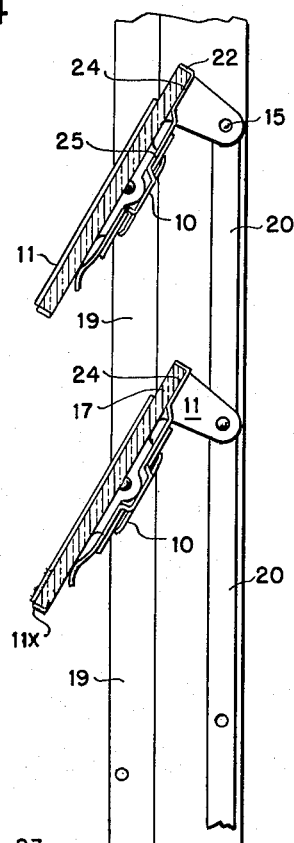
Figure 1:
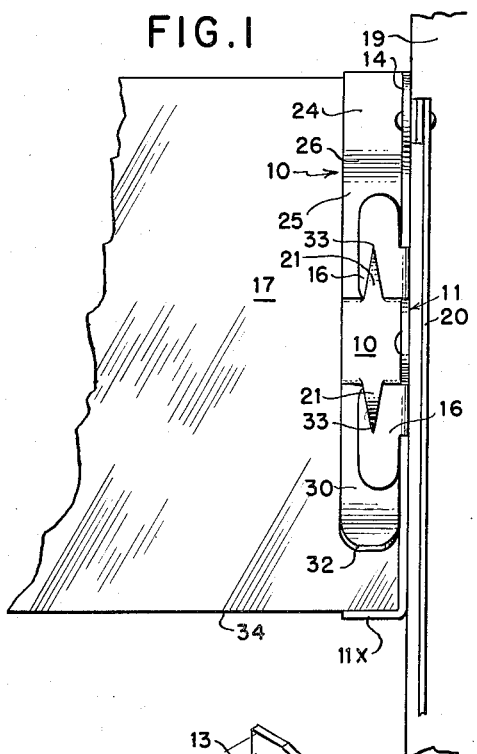
Figure 3:
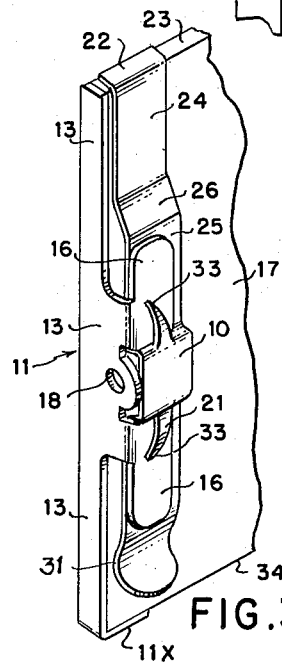
Figure 2:
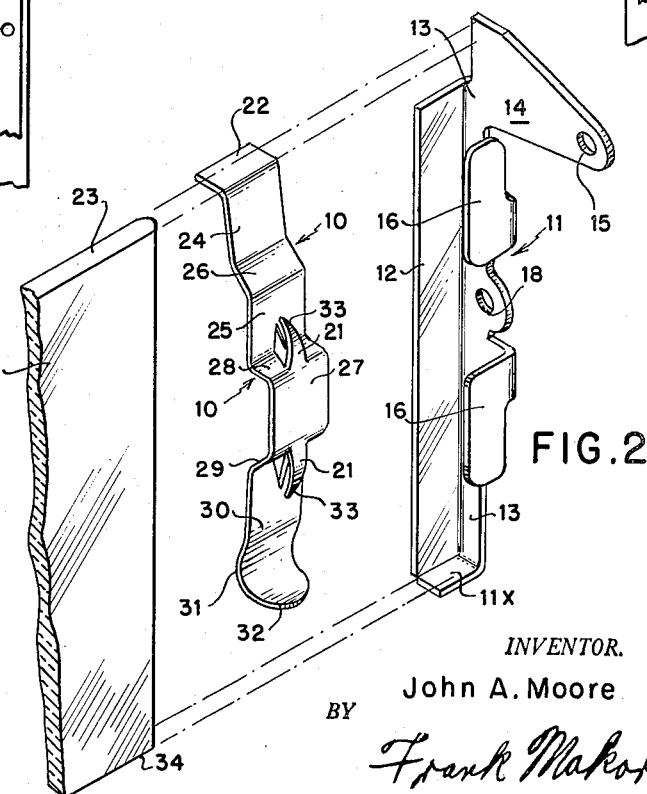

These and other objectives of this invention will become apparent upon reading the following disclosure taken in connection with the accompanying drawing in which, Fig. 1 is a front view of the bracket, Fig. 2 is an exploded perspective view of the bracket showing from left to right, the pane of glass, the spring clip element and the base bracket element, Fig. 3 is a perspective view of an assembled bracket and Fig. 4 is a cross section of a pair of jalousie glass panes disposed hingedly in a window frame.

The bracket of this invention consists of two elements, namely a resilient unitary spring clip 10 and a co-acting bracket base piece 11.

The bracket base piece 11 is made from a piece of flat sheet metal bent and cut to provide a channel adapted to receive a longitudinal pane of plate glass of the jalousie window variety. The bracket 11 is provided with both a back support panel 12 and a base support panel 11X secured integrally and at a right angle to an end panel 13 having an extension piece 14 at its top (Fig. 2). The extension piece 14 is provided with an aperture 15.

The end panel 13 is secured integrally and at a right angle to a pair of spaced-apart platform pieces 16 disposed over the back panel 12. The space between the back panel 12 and the platform pieces 16 is of a depth size adapted to receive a thick pane of plate glass 17 and the spring clip 10 (Fig. 4).

The side panel 13 is provided with a centrally disposed aperture 18 adapted to be pivotally secured to a vertical wall 19 of the window structure. The aperture 15 is secured pivotally to a conventional travel bar 20, said bar being secured to conventional manually operated means (not shown) for moving the travel bar selectively and reciprocally up and down.

An important feature of this invention is the construction of the spring clip 10 having a pair of opposed seizure elements or talons 21 adapted to lockingly seize the top surfaces of the corresponding co-acting platform pieces 16 (Figs. 1, 3 and 4).

The spring clip 10 is of unique construction and is provided with a horizontal top edge panel 22 of a width equal to and adapted to seize the top edge 23 of plate glass 17 (Fig. 2).

Adjacent to panel 22 and integrally united at right angle thereto is a first vertical panel 24 which contacts the inside surface of plate glass 17 with a constant spring pressure (Fig. 4).

A second vertical panel 25 is secured to panel 24 by a common obliquely disposed spacer panel 26 integral to both panels 24 and 25 thereby disposing panel 25 at a plane away from and in spaced-apart relationship to the surface of plate glass 17 (Fig. 4).

A third vertical panel 27 is secured in turn to panel 25 by a common obliquely disposed spacer panel 28 integral with both panels 25 and 27. Vertical panel 27 is provided with a second obliquely disposed spacer panel 29 disposed away from and in opposed relationship to panel 28. A curvatured flat spring depending panel 30 is secured integrally to panel 29 having a base line segment 31 for contacting plate glass 17 with a constant urging pressure. A curvatured and upwardly disposed finger grasp 32 is secured integrally to panel 30 at the line of plate glass contact 31.

Talons 21 are cut from the respective panels 28 and 29 and even from adjacent corresponding panels 25 and 30 according to the length of the talons desired.

The bracket 11 is preferably made from non-corrosive metal such as aluminum and the metal spring clip 10 is made from noncorrosive spring metal for example, stainless steel.

As shown in the exploded view (Fig. 3), the spring clip 10 slides into co-acting relationship with bracket 11 with the tips 33 of talons 21 of the spring clip 10 engaging the appropriate respective platform pieces 16 with a seizure force, said pieces 16 being thereby respectively disposed between panel 25 and a portion of panel 30 and the corresponding tip 33 of a respective talon 21, thereby locking clip 10 to bracket 11.

The pane of plate glass 17 may be pushed into place against back panel 12 and clip 10, either from the top of the assembled bracket by pushing edge panel 22 horizontally toward the platform pieces 16 thereby producing a gap for insertion of glass 17, or alternatively and preferably, the glass 17 may be inserted by lifting finger grasp 32 an d pushing glass 17 thereunder until the bottom edge 34 of the glass pane passes over the rim of support panel 11X so that the pane of glass 17 is spring pressed against the back panel 12 of bracket 11 and held against the force of gravity by panel 11X.

When the pane of plate glass 17 is inserted into place from the outside of the house the finger grasp 32 is lifted. However, if it is desired to insert the pane of glass from the inside, the method whereby panel 22 is activated is employed.

In the operation of windows of the jalousie type, one travel bar 20 suffices to rotate the plurality of brackets, in which event the bracket disposed on the left of the glass 17 (Fig. 3) need not have an extension piece 14. However, where two travel bars 20 (not shown) are employed to rotate the plurality of panels both the left and the right bracket are provided with extension pieces 14. It is apparent that a left bracket complements a right bracket in the supporting of a common pane of glass 17.

The glass 17 disposed in an assembled bracket is seized with spring pressure by clip 10 at three points, viz. by panels 22 and 24 and at line of contact 31. In the construction of clip 10, the panel 24 and contact point 31 are so located relative to panel 27 that they are pushed back by glass 17 thereby effecting a locking spring seizure which prevents rattling of the pane 17 due to vibration or wind distrubances.

The clip 10 thus effects a seizure of the glass 17 at a plurality of points with two points on the inwardly disposed flat surface thereof. Such a seizure is of a balanced nature for it is in spaced-apart relationship. Since two spring loaded brackets 11 are used to secure a pane of plate glass, such a pane is held against the corresponding back panels 12 at four pressure points constantly engaging the inside surface of glass 17, i. e. two points at each end.

The glass pane 17 when disposed in place is locked therein so that the spring-loaded brackets are self-locking, requiring no additional effort. The plate glass moreover is permanently locked in place since the spring pressure is constantly applied.

The spring-loaded bracket of this invention requires no moving parts and is of simple inexpensive construction.

Having disclosed the invention, it will now become readily apparent that obvious changes can be made in the basic concept, but all these changes, for example, in the shape of the talons, etc., all are intended to be embraced within the scope of the claims herein.

I claim:

1. A retainer bracket assembly for retaining a pane of jalousie plate glass comprising a bracket piece having a back panel and a side panel disposed at right angles to and integral with said back panel and a pair of spaced-apart platform pieces disposed over said back panel and integral with said side panel, a longitudinal unitary flat leaf spring clip having an elevated top central rectangular panel, a pair of seizure talons integral with said central panel and disposed on opposite sides thereof, and a pressure exerting bottom element disposed on each side of said top elevated panel for engaging said plate glass with constant urging pressure, whereby said glass is locked securely in place.

2. The bracket assembly of claim 1 wherein one of said pressure exerting elements is a line segment of said spring clip and wherein the other pressure exerting element is a rectangular area in contact with said glass and in spaced-apart relationship to said segment.

References Cited in the file of this patent

UNITED STATES PATENTS

| | | |
|---|---|---|
| 32,920 | Wyberd | July 23, 1861 |
| 687,705 | Walker | Nov. 26, 1901 |
| 2,607,585 | Hashimoto | Aug. 19, 1952 |